Sept. 24, 1940.  R. COVER  2,216,065
CORN CUTTING HEAD
Filed Nov. 25, 1938   4 Sheets-Sheet 1

Inventor
Ralph Cover
By Mason + Porter
Attorneys

Sept. 24, 1940. R. COVER 2,216,065
CORN CUTTING HEAD
Filed Nov. 25, 1938 4 Sheets-Sheet 3

Inventor
Ralph Cover
By Mason & Porter
Attorneys

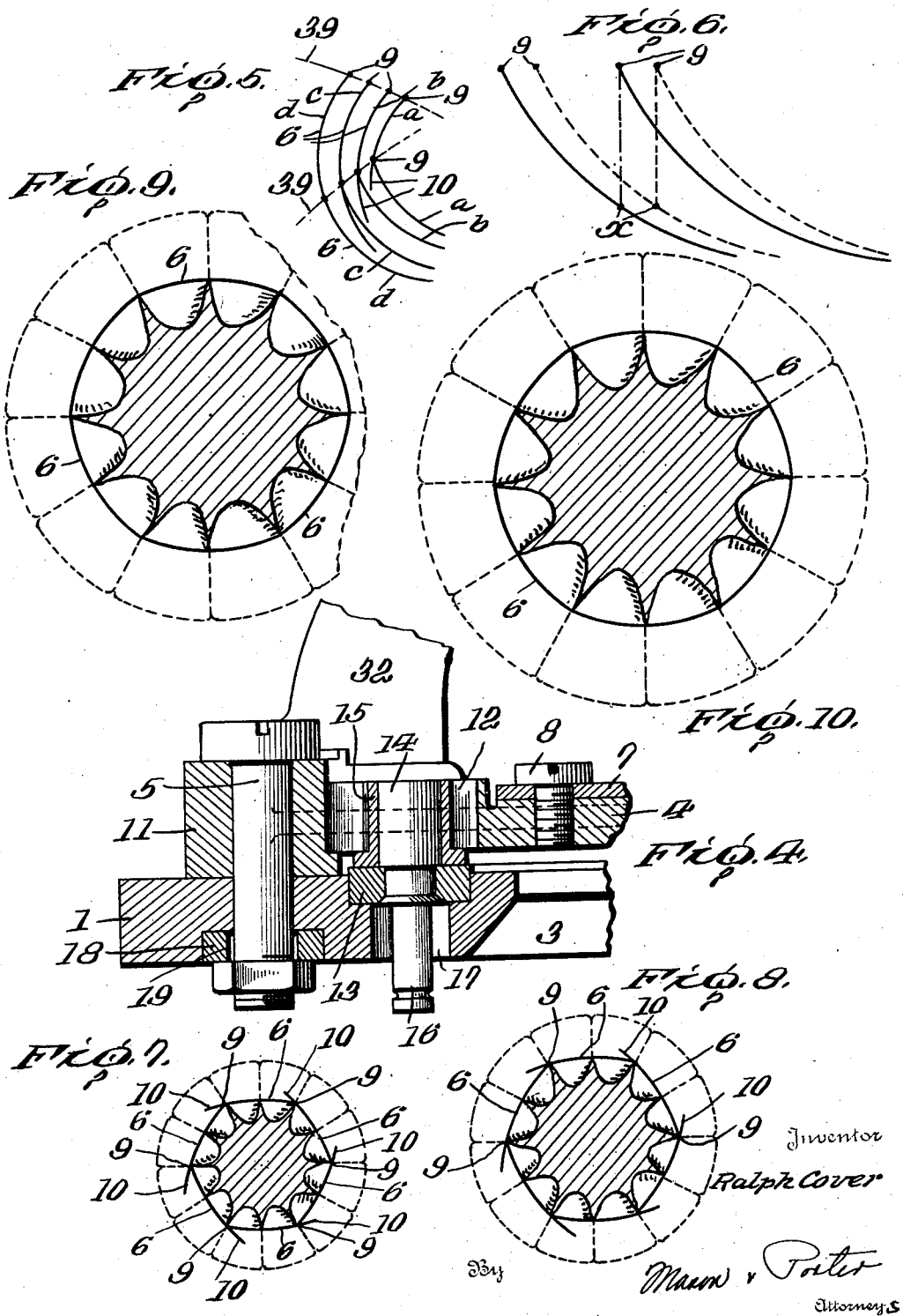

Patented Sept. 24, 1940

2,216,065

UNITED STATES PATENT OFFICE 2,216,065

CORN CUTTING HEAD

Ralph Cover, Westminster, Md.

Application November 25, 1938, Serial No. 242,410

14 Claims. (Cl. 130—9)

The invention relates generally to the art of cutting green corn from cobs in the whole grain for canning purposes and primarily seeks to provide novel means for cutting the grains as closely and perfectly as is practical and possible, and with an absolute minimum of waste, and constituting certain new and useful improvements in the form of cutter head disclosed in my co-pending application for Letters Patent filed March 3, 1936, Serial Number 66,936.

In all conventional forms of corn cutters of which I am aware, much difficulty and waste is occasioned by reason of improper shaping and mounting of the cutting blades, resulting in objectionable "nick cutting," caused by side nicking or V-cutting by blade tips, "slash cutting," caused by exaggerated angular positioning of the blades, or "double cutting," caused by overlapping and crossed positioning of the cutting edges of adjacent blades whereby a trailing blade portion will again cut grains or kernels previously cut by advance blade portions. Nick cut corn is very objectionable from an appearance standpoint, whereas objectionable slash cutting and double cutting is very wasteful in addition to being objectionable in appearance. The present invention seeks to remedy these conditions.

Among the objects of the invention is to provide a cutter head in which the blades are so constructed and mounted that portions of the blades in position for effecting a cutting action can never be crossed one over another so as to effect a double cutting action.

Another object is to provide a cutter head in which the blades are so constructed and mounted that the tip portions only of the blades cut the grains or kernels of small ears of corn of the range of ears of which the particular head is capable of cutting, and in which the heels of the blades are initially extended outwardly beyond the cutting circle and gradually approach presentation in the cutting circle as progressively larger ears are cut, being ultimately presented for cutting effect in that circle only when the largest ear of said range of ears is being cut.

Another object of the invention is to provide an improved cutter head in which each cut depth gage is mounted for movement with a cutting blade and is positioned directly in front of the tip portion of that blade so that each depth gage bears upon and is positioned by the kernels which the trailing associated blade tip portion will cut.

Another object of the invention is to provide an improved cutter head embodying novel means for mounting the cutting blades, novel means for tensioning the blades or yieldably holding them against the corn, and novel means for manually adjusting and securing adjustments of the blades.

With the above and other objects in view that will hereinafter appear, the nature of the invention will be more clearly understood by following the detailed description, the appended claims, and the several views illustrated in the accompanying drawings.

In the drawings:

Figure 4 is a detail vertical cross-section taken on the line 4—4 on Figure 2.

Figure 5 is a diagrammatic view illustrating, in the direction of cut, four positions of adjustment of each of two blades, and the relation of the blade tips of one of the blades to the trailing cutting edge portion of the other blade in such positions of adjustment.

Figure 6 is a diagrammatic view illustrating, across the line of cut, the position of two blades and the relation of the tip portion of one to the trailing cutting edge of the other in two positions of adjustment thereof.

Figures 7, 8, 9 and 10 are diagrammatic vertical cross-sectional views respectively illustrating the cutting of four successively larger ears of corn.

The improved cutter head includes an upright head plate 1 adapted to be removably mounted in the frame of a corn cutting machine of any suitable construction. The plate includes a handle 2 for facilitating placement and removal thereof, and a central opening or aperture 3 serving as a feed passage through which the ears of corn to be cut are fed in the direction of the axes of the cobs.

Figure 1:
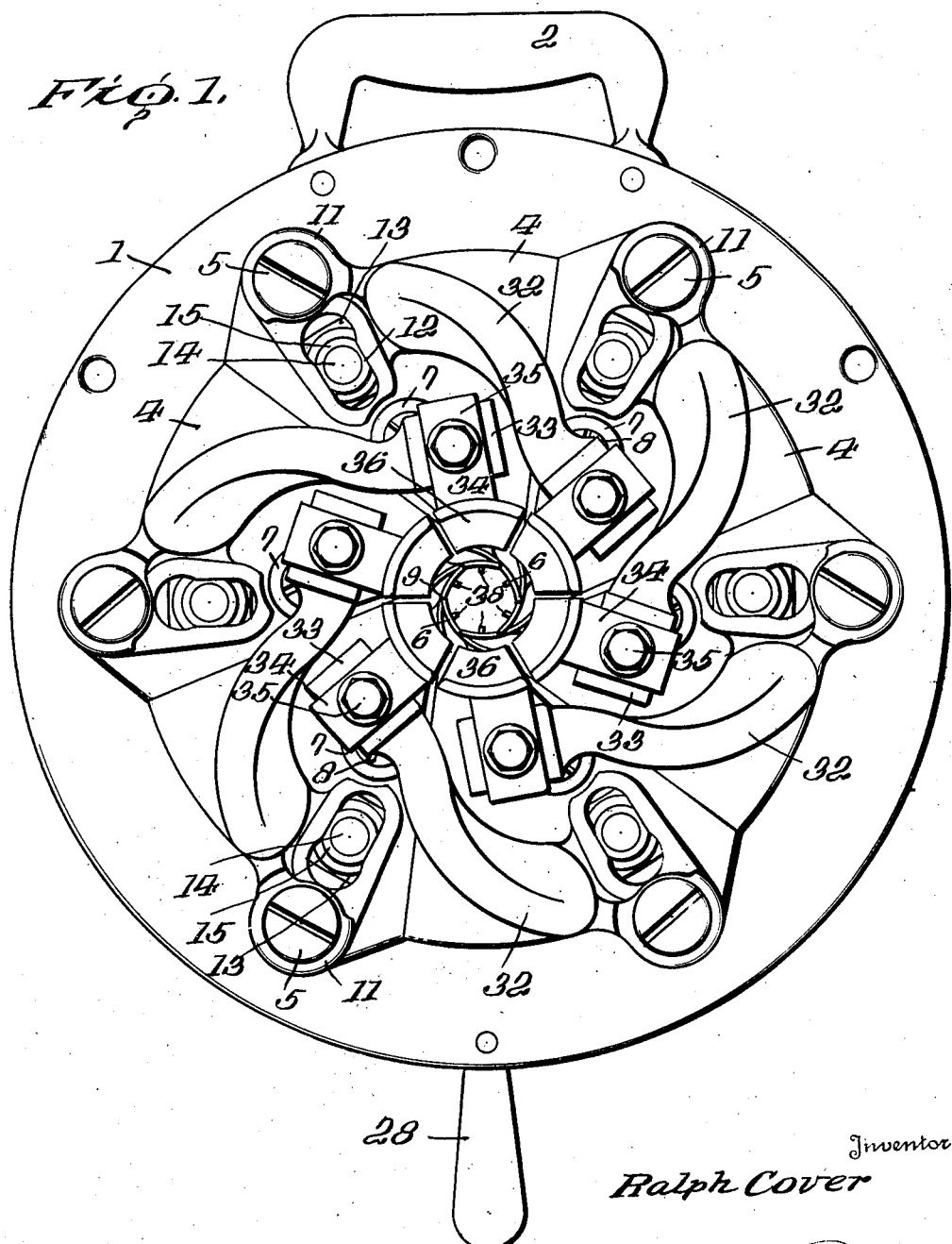
Figure 1 is a front face view of a cutter head constructed in accordance with the invention, the blades being shown in the contracted or closed position.
Figure 2:
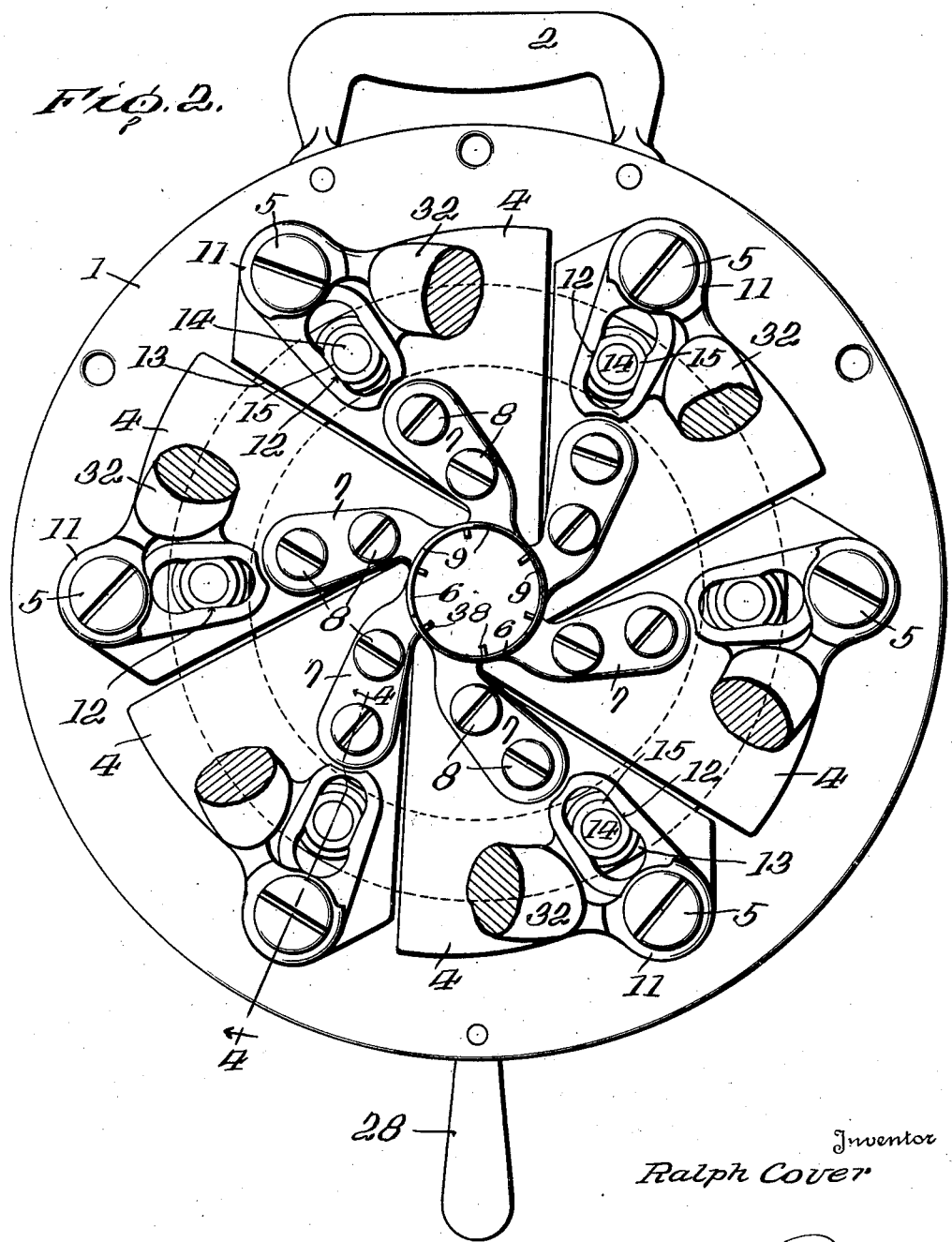
Figure 2 is a view similar to Figure 1, the cut depth gage supporting arms being broken away to better illustrate the cutter blades and arms, and the blades being shown opened to the maximum of their intended cutting range.

A plurality of lever arms 4 of identical construction are pivotally mounted in equidistantly spaced relation at the front face of the cutter head, as illustrated in Figures 1 and 2 of the drawings. In this particular disclosure, six such arms comprise the complete complement, and since the arms are identical in construction, a detailed description of one will suffice for all of them.

Each arm 4 is pivotally supported upon a stud 5, the studs being equidistantly spaced about a circle adjacent the periphery of the head plate as indicated in Figures 1 and 4 of the drawings. Each arm is somewhat triangular or sector-shaped, and the inner portions thereof conjointly close the head plate aperture 3 in the manner illustrated in Figures 2 and 3 of the drawings. Each arm carries a cutting blade 6, and each blade includes an apertured mounting shank 7 which is secured to the inner end of the respective supporting arm 4 through the medium of screws 8.

The blades 6 are relatively long and narrow and are so shaped and supported upon the respective arms that they extend in overlapping relation helically about the axis of the aperture so that their cutting edges bear angular relation to the aperture axis and each blade presents a tip portion 9 and a heel portion 10.

The blades are of sufficient length so that their overlapped relation will not be disturbed to provide gaps between adjacent tip and heel portions regardless of the extent to which the arms are opened within the cutting range of the particular head. Each blade is shaped upon the true arc of a circle substantially conforming to the cross section curvature of the cob of the largest ear of corn which the particular cutting head is adapted to cut, and it is a feature of the invention to so co-relate the arcuate cutting edge of the respective blades and the pivots upon which they are mounted that the blade tips will always lie in, and never cross, the cutting circle. Expressed in another manner, the parts are so co-related that each blade tip will always substantially aline with the overlapped blade cutting edge portion directly behind it. By reason of constructing and mounting the blades in the manner referred to, double cutting of the grains or kernels of corn is definitely avoided.

The term "cutting circle" is not intended necessarily to refer to a perfect circle, but rather to that generally circular line along which the cutting edges of the blades sever the grains or kernels of corn from the cobs. When cutting the largest ear of the range of ears adapted to be cut by the particular head, the cutting circle will be a perfect circle as illustrated in Figure 2 of the drawings, whereas in the cutting of ears of lesser sizes, as illustrated in Figures 7 through 10 of the drawings, the cutting circle, while being generally circular, will not constitute a perfect circle.

Figure 3:
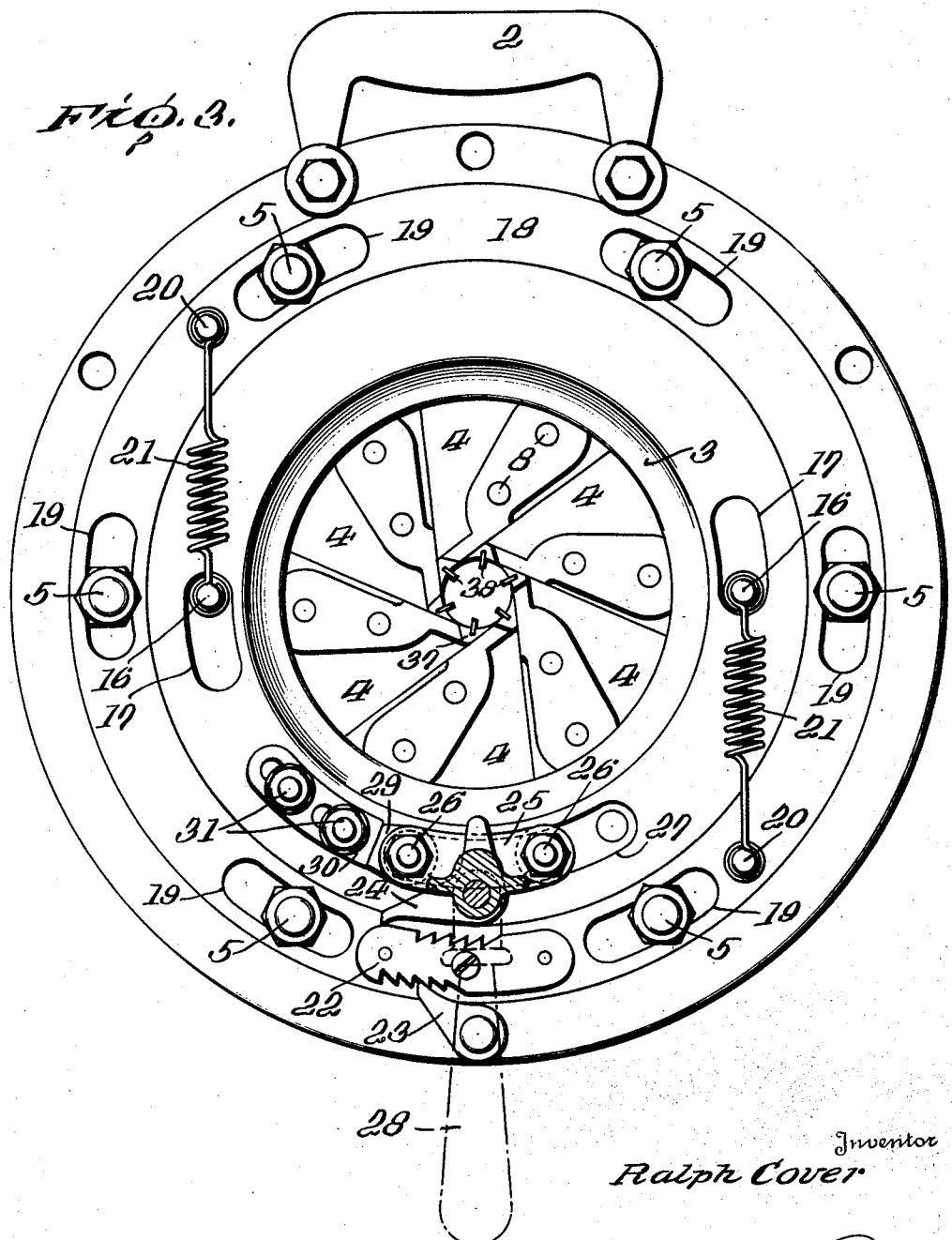
Figure 3 is a rear face view of the cutter head, the parts being positioned as shown in Figure 1, and the manual adjustment handle being shown in section.

Each arm 4 includes a hub 11 through which the pivot stud 5 projects, and a longitudinal slot 12 extending radially inwardly from said hub in the manner illustrated in Figures 1, 2 and 3 of the drawings. On its front face the head plate is equipped with an annular recess or channel in which a ring 13 is adjustably mounted, and this ring carries a plurality of studs 14, one operable in each of the arm slots 12. Each stud 14 is surrounded by a bushing 15 slidably engaging the walls of the respective slot, and it will be obvious that as the ring 13 is adjusted about the axis of the head plate, all of the arms 4 will simultaneously be swung outwardly or inwardly depending upon the direction in which the ring is moved.

At two diametrically opposite points, ring studs 14 are provided with extensions 16 operable in arcuate slots 17 formed in the head plate, as shown in Figures 3 and 4 of the drawings. At its rear face, the head plate is provided with an annular recess or channel in which an abutment tension ring 18 is shiftably mounted. Said ring is provided with arcuate slots 19. Pivots 5 extend through these slots and the nuts threaded on to the pivots 5 serve to retain the ring 18 in the channel while permitting the same to move freely therein. Anchor pins 20 are carried by this abutment tension ring and springs 21 are secured to the anchor pins and to the studs 16. These studs 16, as noted above, are secured to the ring 13 which carries the studs 14. The springs tend to move the ring 13 so as to move the blades toward the axis of the aperture in the head.

A retainer sector 22 is secured to the tension ring 18 and is equipped at its inner and outer edges with retainer notches as shown in Figure 3 of the drawings. A pivoted retaining dog 23 is mounted at the lower peripheral edge of the plate and is engageable with the adjacent notches of the member 22 for holding adjustments of the ring 18. A similar dog 24 is pivotally supported on a bracket 25 secured by studs 26 to the ring 13 and movable in a longitudinal slot 27 formed in the head plate. A handle 28 is attached to the bracket 25 and serves as a means by which the ring 13 can be manually shifted when it is desired to place the cutting blades in wide open position. The trip dog 24 engaging the notches in the member 22 will serve to hold the cutter blades in this wide open position.

The bracket 25 also includes a stop portion 29 engageable with a stop member 30 adjustably supported as at 31 on the rear face of the head plate, and these stop elements serve to limit movement of the blade supporting arms 4 inwardly under the urge of the tension springs 21. When it is desired to increase the tension on the springs 21, the ring 13 is shifted so as to bring it into engagement with the notch in the member 22, and then the abutment tension ring 18 is shifted in a clockwise direction. The dog 23 will drop into the outer notches of this member 22 and hold this ring 18 to its shifted position. The trip dog 24 is then released from the notches so as to permit the ring 13 to move until the stop 29 is in engagement with the stop member 30. The cutters are now positioned in their contracted position ready to receive the ear for operation thereon.

Each arm 4 includes a depth gage supporting arm 32 which is formed integrally therewith and projects forwardly and inwardly or helically therefrom in the same general direction in which the blades project. Each gage arm 32 includes a mounting head 33 to which a depth gage mounting shank 34 is secured as at 35, and each gage includes a curved corn ear engaging portion 36, as shown in Figure 1 of the drawings. The gage heads 36 collectively form a sort of funnel into which the ears of corn are fed, and by reason of the engagement of the corn ears therewith, they serve to automatically position the blades for properly engaging and cutting the grains or kernels of corn.

Each arm also includes an auxiliary gage mounting extension 37 disposed parallel the cob axis and equipped with a blunt edge auxiliary gage blade 38. The gage heads 36 and the gage blades 38 serve the same broad purpose described in my previous application for Letters Patent hereinbefore referred to. However, in my previous disclosure, and in other disclosures of which I am aware and which have been found deficient because of the objectionable double cutting, eliminated in my improved cutter, the depth gages do not gage the depth of cuts of the blades movable with them. In such disclosures, each cut depth gage gaged the depth of cut made by a blade movably supported on an arm other than that on which the gage was mounted, and consequently the problem of double cutting was aggravated in such structures. In the improved cutter head herein disclosed each cut depth gage head 36 moves with and gages the depth of cut of a particular blade 6. It will be observed by reference to Figures 1 and 2 of the drawings that each gage head 36 is positioned directly in front of the tip portion of the blade 6 mounted on and movable with the same arm 4 which supports said gage head. By reason of this positioning of the parts, each gage head bears upon and is positioned by the kernels which the trailing associated blade tip portion will cut.

The individual curved blades 6 are so mounted with relaiton to their respective pivots that when the supporting arms are in repose and the blades in their innermost position as illustrated in Figure 1, the tips of the blades lie in a circle and the heels of the blades lie in a larger circle. In the cutting of all ears of corn smaller than the maximum size for which the particular cutter head is adapted, the cutting is performed by the tip portions only of the blades, and as successively larger ears are engaged by the blades an ever increased amount of tip portion or cutting edge of the blades will be presented in cutting relation, so that ultimately, when the largest ear is being cut, a perfect circle of cutting edges will be presented, as illustrated in Figure 2 of the drawings, and the heel portions 10 of the blades will aid in the cutting function.

In Figure 5 of the drawings, I have attempted to illustrate the manner in which the curvature of the blades and the pivot mountings thereof are co-related so as to cause the blade tips always to lie in and never cross the cutting surface, and whereby any given blade tip portion will always substantially aline with the overlapped blade cutting edge portion directly behind it. In Figure 5 I have diagrammatically indicated four positions of adjustment of two blades, cutting circles of successive increasing sizes being indicated at $a$, $b$, $c$, and $d$. The blade tips are indicated by the heavy black dots and the lines on which these tips move, during adjustment of the blades to adapt them to the cutting of successively larger ears, are indicated at 39.

I have also diagrammatically illustrated in plan view, in Figure 6, adjusted positions of two blades, and the manner in which the tip portion of one blade always alines with the cutting edge of the overlapped or trailing portion of an adjacent blade. In this illustration the blade tips are illustrated at 9 and the points of alinement thereof with trailing cutting edges of adjacent blades is indicated at $x$.

In the foregoing description I have disclosed a simple and efficient cutting head in which the blades are so shaped and mounted that in every position of the supporting arms during the cutting of corn, the tip portion of a given blade never crosses the cutting edge of the trailing blade, so as to completely cut around the cob without ever double cutting, slash cutting, or nick cutting.

It is of course to be understood that the details of structure and arrangement of parts may be variously changed and modified without departing from the spirit and scope of my invention.

I claim:

1. In corn cutting apparatus, a support having a feed aperture through which the corn to be cut is fed in the direction of the axis of the cobs, a plurality of rigid cutting blades each having a helical cutting edge including a tip portion and a heel portion, means for adjustably mounting the blades in equidistantly spaced relation about the axis of the aperture with the blade tips arranged in a circle and the cutting edges overlapped one behind another and in angular relation to said aperture axis, said heels being normally disposed in a circle outwardly of the tip circle, and means for moving the blades as corn ears of different sizes are cut, so that the tip portions alone of the blades cut small ears and the amount of blade effective in cutting the ears increases as the size of ear increases whereby the heels will aid in cutting only the largest ears to be cut and the blade tips will never be permitted to cross blade cutting edge portions lying therebehind.

2. In corn cutting apparatus, a support having a feed aperture through which the corn to be cut is fed in the direction of the axis of the cobs, a plurality of arcuately shaped rigid cutting blades each including a tip portion and a heel disposed in equidistantly spaced overlapped helical relation about the axis of the aperture with the blade tips lying in a cutting circle, pivoted arms for movably supporting the cutting blades, means controlled by the ears for automatically shifting the arms for positioning the blades for variations in sizes of corn ears being cut, each blade being so disposed on its cutting arm and relative to the pivot thereof, that the blade tips move outwardly always in the cutting circle, and the blade heels move relatively inward to ultimately lie in the cutting circle only when the largest ear to be cut is being engaged by the blades whereby a double cutting of the kernels is prevented.

3. In corn cutting apparatus, a support having a feed aperture through which the corn to be cut is fed in the direction of the axis of the cobs, a plurality of arcuately shaped rigid cutting blades each including a tip portion and a heel portion disposed in equidistantly spaced overlapped helical relation about the axis of the aperture with the blade tips lying in a cutting circle, and means for movably supporting the blades for automatic adjustment to variations in sizes of corn ears being cut whereby the blade tips move outwardly always in the cutting circle and the blade heels move relatively inward to ultimately lie in the cutting circle only when the largest ear to be cut is being engaged by the blades, said blades being shaped in true arcs of a circle substantially conforming to the cross section curvature of the cob portion of the largest ear of corn to be cut.

4. In corn cutting apparatus, a support having a feed aperture through which the corn to be cut is fed in the direction of the axis of the cobs, a plurality of rigid cutting blades each including a tip and a heel disposed in equidistantly spaced relation about the axis of the aperture with the tips lying in a cutting circle and with the cutting edges overlapping an angular relation to the aperture axis, pivoted arms for movably supporting the cutting blades, and means controlled by the ears for automatically shifting the arms for positioning the blades for variations in sizes of corn ears being cut, each blade being so disposed on its supporting arm and relative to the pivot thereof, that the tips move outwardly to compensate for larger ears and always substantially align with the overlapped blade cutting edge portion directly therebehind whereby a double cutting of the kernels is prevented.

5. In corn cutting apparatus, a support having a feed aperture through which the corn to be cut is fed in the direction of the axis of the cobs, a plurality of arcuately shaped rigid cutting blades each including a tip portion and a heel portion disposed in equidistantly spaced overlapped helical relation about the axis of the aperture with the blade tips lying in a cutting circle, pivoted arms for movably supporting the cutting blades, and means controlled by the ears for automatically shifting the arms for positioning the blades for variations in sizes of corn ears being cut, each blade being so disposed on its supporting arm and relative to the pivot thereof that the blade tips move outwardly to compensate for larger ears and always substantially align with the overlapped blade cutting edge portion directly therebehind whereby a double cutting of the kernels is prevented.

6. In corn cutting apparatus, a support having a feed aperture through which the corn to be cut is fed in the direction of the axis of the cobs, a plurality of arcuately shaped rigid cutting blades each including a tip portion and a heel portion disposed in equidistantly spaced overlapped helical relation about the axis of the aperture with the blade tips lying in a cutting circle, pivoted arms for movably supporting the cutting blades, and means controlled by the ears for automatically shifting the arms for positioning the blades for variations in sizes of corn ears being cut, each blade being so disposed on its supporting arm and relative to the pivot thereof that the tips move outwardly to compensate for larger ears and always substantially align with the overlapped blade cutting edge portion directly therebehind, said blades being shaped in true arcs of a circle substantially conforming to the cross section curvature of the cob portion of the largest ear of corn cut whereby the blade heel portions move into the cutting circle and aid in the cutting function only during the cutting of the largest size ears and the blade tips never cross blade cutting edge portions lying therebehind.

7. In corn cutting apparatus, a support having a feed aperture through which the corn to be cut is fed in the direction of the axis of the cobs, a plurality of arcuately shaped rigid cutting blades each including a tip portion and a heel portion disposed in equidistantly spaced overlapped helical relation about the axis of the aperture with the blade tips lying in a cutting circle, a carrier arm supporting each blade and swingably mounted on said support, the pivots of said arms being disposed in a circle concentric to the aperture axis, and means for causing the arms to move for positioning the blades in accordance with the size of corn ears being cut, each said blade being positioned on its supporting arm so as to always present the tip in the cutting circle and the heels outwardly of the cutting circle in ever decreasing degree accordingly as successively larger corn ears are being cut.

8. In corn cutting apparatus, a support having a feed aperture through which the corn to be cut is fed in the direction of the axis of the cobs, a plurality of arcuately shaped rigid cutting blades each including a tip portion and a heel portion disposed in equidistantly spaced overlapped helical relation about the axis of the aperture with the blade tips lying in a cutting circle, a carrier arm supporting each blade and swingably mounted on said support, the pivots of said arms being disposed in a circle concentric to the aperture axis, and means for causing the arms to move for positioning the blades in accordance with the size of corn ears being cut, each said blade being positioned on its supporting arm so as to always present the tip in the cutting circle and the heels outwardly of the cutting circle in ever decreasing degree accordingly as successively larger corn ears are being cut, said blades being shaped in true arcs of a circle substantially conforming to the cross section curvature of the cob portion of the largest ear of corn to be cut whereby the blade heel portions move into the cutting circle and aid in the cutting function only during the cutting of the largest size ears.

9. In corn cutting apparatus, a support having a feed aperture through which the corn to be cut is fed in the direction of the axis of the cobs, a plurality of arcuately shaped rigid cutting blades each including a tip portion and a heel disposed in equidistantly spaced overlapped helical relation about the axis of the aperture with the blade tips lying in a cutting circle, a carrier arm supporting each blade and swingably mounted on said support, the pivots of said arms being disposed in a circle concentric to the aperture axis, and means for causing the arms to move for positioning the blades in accordance with the size of corn ears being cut, the blade cutting edges and the arm pivots being so correlated that the blade tips always lie in and never cross the cutting circle.

10. In a corn cutting apparatus, a support having a feed aperture through which the ear of corn to be cut is fed in the direction of the axis of the ear, a plurality of cutting blades each having a helical cutting edge including a tip portion and a heel portion, movable means for supporting the blades in equi-distant spaced relation about the axis of the ear, and means controlled by the ear for automatically positioning the blades for operation upon the ear being cut, said blades being disposed so that the tips thereof are the advanced cutting portions for all sizes of ears, said blades being curved so as to overlie and form, in effect, a complete cutting circle with the tips lying in said cutting circle for all sizes of ears, and with the heel portions lying in said cutting circle for ears of maximum diameter and outside of said cutting circle for ears of smaller diameter whereby a double cutting of the kernels is prevented.

11. In a corn cutting apparatus, a support having a feed aperture through which the ear of corn to be cut is fed in the direction of the axis of the ear, a plurality of rigid cutting blades each having a helical cutting edge including a tip portion and a heel portion, movable means supporting the blades in equi-distant spaced relation about the axis of the ear, and means controlled by the ear for automatically positioning the blades for operation upon the ears being cut, said blades being disposed so that the tips thereof are the advanced cutting portions for all sizes of ears, said blades being curved so as to overlie and form, in effect, a complete cutting circle with the tips lying in said cutting circle for all sizes of ears, and with the heel portions lying in said cutting circle for ears of maximum diameter and outside of said cutting circle for ears of smaller diameter whereby a double cutting of the kernels is prevented.

12. In a corn cutting apparatus, a support having a feed aperture through which the ear of corn to be cut is fed in the direction of the axis of the ear, a plurality of cutting blades each having a helical cutting edge including a tip portion and a heel portion, a carrier arm supporting each blade and swingably mounted on said support, means for causing the arms to move for positioning the blades in accordance with the size of the ears being cut, said blades being disposed so that the tips thereof are the advanced cutting portions for all sizes of ears, said blades being curved so as to overlie and form, in effect, a complete cutting circle with the tips lying in said cutting circle for all sizes of ears, and with the heel portions lying in said cutting circle for ears of maximum diameter and outside of said cutting circle for ears of smaller diameter whereby a double cutting of the kernels is prevented.

13. In a corn cutting apparatus, a support having a feed aperture through which the ear of corn to be cut is fed in the direction of the axis of the ear, a plurality of rigid cutting blades each having a helical cutting edge including a tip portion and a heel portion, a carrier arm supporting each blade and swingably mounted on said support, the pivots of said arms being disposed in a circle concentric to the axis of the aperture each blade being so disposed on its supporting carrier arm and relative to the pivot on which said arm swings that the blade tips move outwardly always in the cutting circle, and the blade heels move relatively inward to ultimately lie in the cutting circle only when the largest ear to be cut is being engaged by the blades whereby a double cutting of the kernels is prevented, gauging devices associated with said arms and adapted to engage the ear in advance of the cutting blades, and means for connecting the gauging devices with the arms for moving said arms to position the blades in accordance with the size of the ears being cut, each gauging device being substantially directly in front of the tip portion of the blade with which it is associated.

14. In a corn cutting apparatus, a support having a feed aperture through which the ear of corn to be cut is fed in the direction of the axis of the ear, a plurality of cutting blades each having a helical cutting edge including a tip portion and a heel portion, a carrier arm supporting each blade and swingably mounted on said support, the pivots of said arms being disposed in a circle concentric to the axis of the aperture, means engageable with said arms between the pivotal supports therefor and the axis of the aperture for moving said arms to position the blades in accordance with the size of the ears being cut, said blades being disposed so that the tips thereof are the advanced cutting portions for all sizes of ears, said blades being curved so as to overlie and form, in effect, a complete cutting circle with the tips lying in said cutting circle for all sizes of ears, and with the heel portions lying in said cutting circle for ears of maximum diameter and outside of said cutting circle for ears of smaller diameter whereby a double cutting of the kernels is prevented.

RALPH COVER.